(No Model.)
W. W. McCALLIP.
TREE PROTECTOR.
No. 472,137. Patented Apr. 5, 1892.
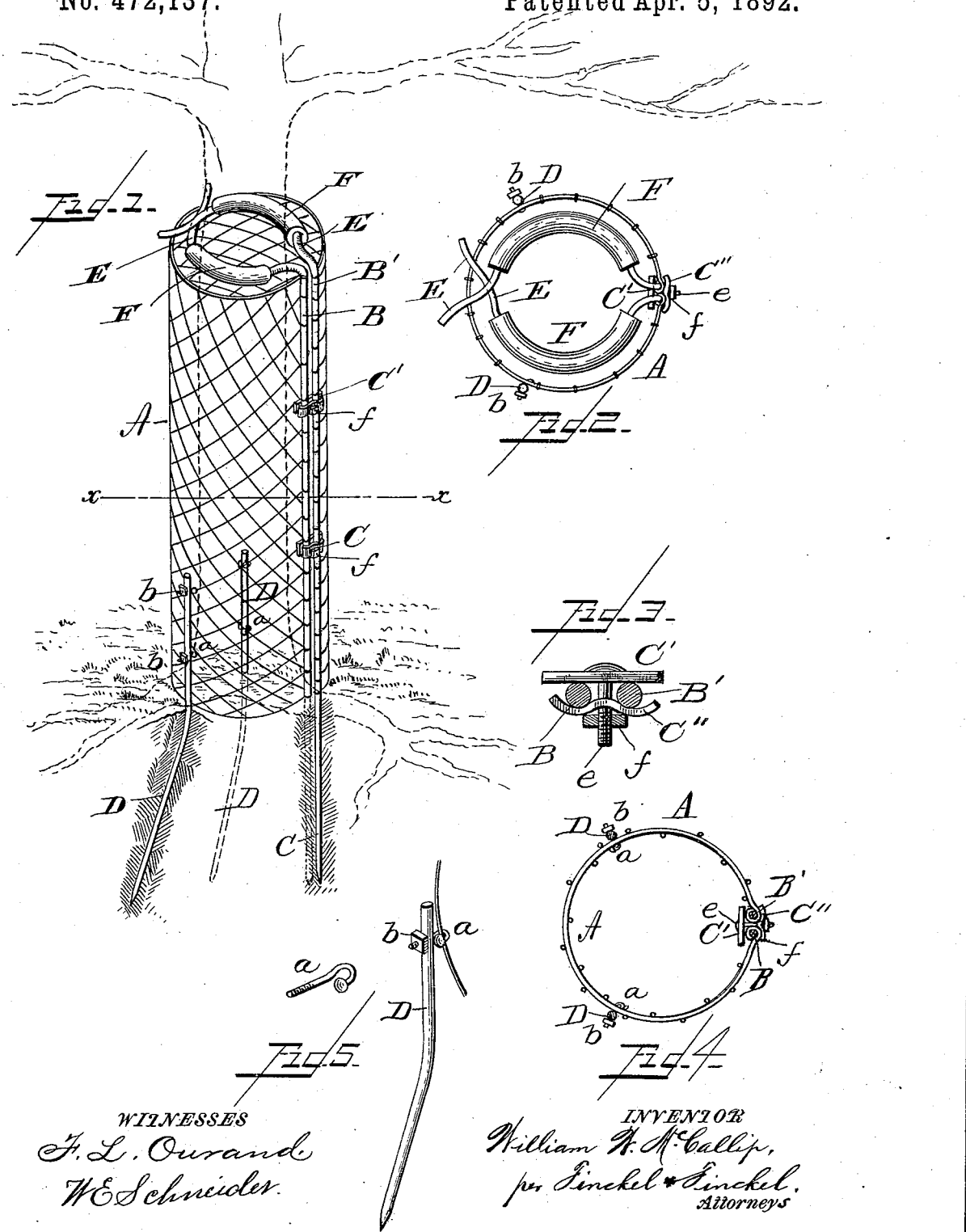

UNITED STATES PATENT OFFICE.

WILLIAM W. McCALLIP, OF COLUMBUS, OHIO.

TREE-PROTECTOR.

SPECIFICATION forming part of Letters Patent No. 472,137, dated April 5, 1892.

Application filed August 19, 1891. Serial No. 403,099. (No model.)

*To all whom it may concern:*

Be it known that I, WILLIAM W. McCALLIP, a citizen of the United States of America, residing at Columbus, in the county of Franklin and State of Ohio, have invented certain new and useful Improvements in Tree-Protectors, of which the following is a specification, reference being had therein to the accompanying drawings.

My invention relates to tree guards or protectors.

Heretofore a great many different forms of protectors have been devised; but no particular one appears to have merited general adoption. The reason for this, I think, is because those that have proved efficient and desirable have been too expensive, and those that have been cheap enough have been too frail and liable to derangement, necessitating much attention and frequent repair.

The object of my invention is to overcome these difficulties and provide a guard that will satisfy the popular demand.

In the drawings herewith, Figure 1 represents a perspective view of a protector made in accordance with my improvements. Fig. 2 is a top plan view. Fig. 3 is an enlarged view of a clamp. Fig. 4 is a sectional view on the line $x\ x$ of Fig. 1, and Fig. 5 is a detail view of one of the legs and its fastening devices.

The letter A on the drawings designates the body of the guard or protector. This is preferably formed from a single rectangular sheet of woven wire bent into the form of a cylinder. The meeting edges of this cylinder are clinched about rods B and B', and the upper ends of these rods are bent inward horizontally over the end of the cylinder and curved so as to fit upon the trunk of a tree. Upon these bent ends of the rods (which I shall denominate "trunk-embracing arms" and which are marked E) I secure cushions F, consisting of short pieces of rubber tubing or hose to prevent abrasion of the bark of the tree. The lower end of one of the rods B or B' is prolonged, as shown at C, so that it may be forced into the ground to assist in holding the protector in place at that end. It is obvious, of course, that both of said rods may be thus extended, as seen in full and dotted lines, Fig. 1. Additional legs or braces D D may be driven into the ground and fastened to the body of the protector. A very efficient fastening for this purpose (illustrated in Fig. 5) consists of a bolt $a$, having its headed end bent around the wires of the protector and its threaded end passed through a hole in the leg and provided with a nut $b$ on its projecting end. The rods B and B' are rotatable on their axes, so that the horizontally-extending curved arms at their upper ends may be adjusted to embrace trees of different diameters, and also to allow for the expansion of the trunk of the tree due to growth. To lock these rods from rotation when the protector has been adjusted to a tree, I provide a clamp composed of two plates C' and C", as shown, which fit upon opposite sides of the bars B and B', and through these plates I pass a bolt $e$, on which is a nut $f$, to secure the parts together.

It will be understood, of course, that I do not limit myself to the precise details of construction shown, for the invention as broadly conceived by me and as defined in my claims may be embodied in many other forms.

What I claim, and desire to secure by Letters Patent, is—

1. In a tree-protector, the combination, with the body portion constructed to surround and protect the trunk of a tree, of a vertically-extending rod having a horizontally-extending trunk-embracing arm, the said rod being rotatable in its socket, whereby the arm may be adjusted independently of the body portion to adapt the protector to trees of different diameters, substantially as shown and described.

2. In a tree-protector, the body portion A, constructed to surround and protect the trunk of a tree, provided with vertically-extending rods B B', rotatable in their sockets and each having a horizontally-extending trunk-embracing arm E, one of said rods being prolonged so as to be secured in the ground, substantially as shown and described.

3. In a tree-protector, the body portion A, provided with vertically-extending rods B B', each having a horizontally-extending trunk-embracing arm E and rotatable in their sockets, and means for locking said rods from rotation, substantially as shown and described.

4. A tree-protector comprising a body portion formed from a sheet A, constructed to surround and protect the trunk of a tree, rods B B', rotatably clinched in the meeting edges of said body portion and each having a trunk-embracing arm E, and means for locking said rods from rotation and at the same time securing the meeting edges of the body portion together, substantially as shown and described.

5. A tree-protector comprising the body portion formed from a sheet A, constructed to surround and protect the trunk of a tree, rods B B', rotatably clinched in the meeting edges of the sheet and each having a trunk-embracing arm E, and means for locking said rods from rotation and securing the edges of the sheet together, consisting of the plate C, plate C', bent or formed to retain the rods, substantially as shown and described, and means for clamping said plates together.

In testimony whereof I affix my signature in presence of two witnesses.

WILLIAM W. McCALLIP.

Witnesses:
FRANK M. RAYMUND,
GEO. M. FINCKEL.